FIG. I

INVENTORS J.F. DILLON JR.
H. MATTHEWS

3,492,061
LIGHT BEAM DEFLECTOR IN WHICH THE LIGHT IS DIFFRACTED BY MAGNETIC WAVES

Joseph F. Dillon, Jr., Morris Township, Morris County, and Herbert Matthews, Madison, N.J., assignors to Bell Telephone Laboratories, Incorporated, New York, N.Y., a corporation of New York
Filed June 18, 1965, Ser. No. 465,119
Int. Cl. G02f *1/28*
U.S. Cl. 350—160            5 Claims

ABSTRACT OF THE DISCLOSURE

An optical beam deflection system in which the beam is directed into a body of transparent ferromagnetic material in which magnetic waves, such as spin waves, have been set up. The waves set up a periodic variation of magnetization which acts like a diffraction grating. The beam is deflected an amount depending upon the magnetic wavelength which is in turn under control of a biasing magnetic field. Spin waves produce high resolution because they have wavelenghts comparable to the optical wavelength.

---

This invention relates to beam deflection systems and, more particularly, to optical beam deflection systems for use in memories, logic, switching, and light modulation arrangements.

With the advent of the optical maser and its highly coherent optical frequency beam, considerable attention has been given to the problem of deflecting a light beam in response to an electrical control signal. One area of investigation has been concerned with variable optical diffraction gratings, similar to the Debye-Sears cell of classical optics, in which a light transparent homogeneous medium is disturbed by the passage of waves of a different form of energy to produce a periodic variation of some parameter that affects the index of refraction of the medium. Light directed through the medium is diffracted as a function of the wavelength of the disturbing wave and with a degree of resoluiton which depends upon the beam width in the interaction region and the ratio of the wavelength of the light to the wavelength of the disturbing wave.

Previously, it has been proposed that the disturbing wave might alternatively constitute an elastic wave of ultrasonic frequency or an electromagnetic wave of microwave frequency. In either case, these proposals were limited by the fact that the wavelength of each of these forms of energy in frequency ranges that can be readily generated are many times that of the light, leading to excessively wide interaction regions or to poor resolution. In addition, the deflection angle in the systems proposed could only be controlled by varying the frequency of the disturbing wave which entails the additional complication and expense of a variable frequency generator. Finally, the use of the elastic wave suffers the further disadvantage that an appreciable time is required for the wave to form and stabilize which severely limits the speed of deflection.

It is therefore an object of the present invention to deflect an optical beam rapidly, with high resolution, by means of a narrow interaction region and under the control of a parameter which can readily and simply be varied.

In accordance with the present invention, it has been recognized that properly directed magnetic spin waves in a transparent ferromagnetic medium can produce a diffraction grating effect. These waves have a wavelength that is very short, being in fact comparable to the wavelength of the optical energy itself, and this wavelength can be varied directly by the strength of a direct current biasing field. Thus, a small interaction region will produce a large, highly resolved deflection which may be rapidly varied by simple control of the magnetic field strength.

In the specific embodiment to be described hereinafter, materials from two particular classes are proposed. In particular, an embodiment will be described in which a disc of iron garnet, such as yttrium iron garnet, is pumped by a radio frequency magnetic field parallel to a variable direct current biasing field to produce spin waves which act as an optical diffration grating. In another embodiment a trivalent chromium halide is pumped by a radio frequency field perpendicular to the biasing field.

These and other objects, the nature of the present invention, its various features and advantages, will appear more fully upon consideration of the various illustrative embodiments now to be described in detail in connection with the accompanying drawings, in which.

Figure 1:
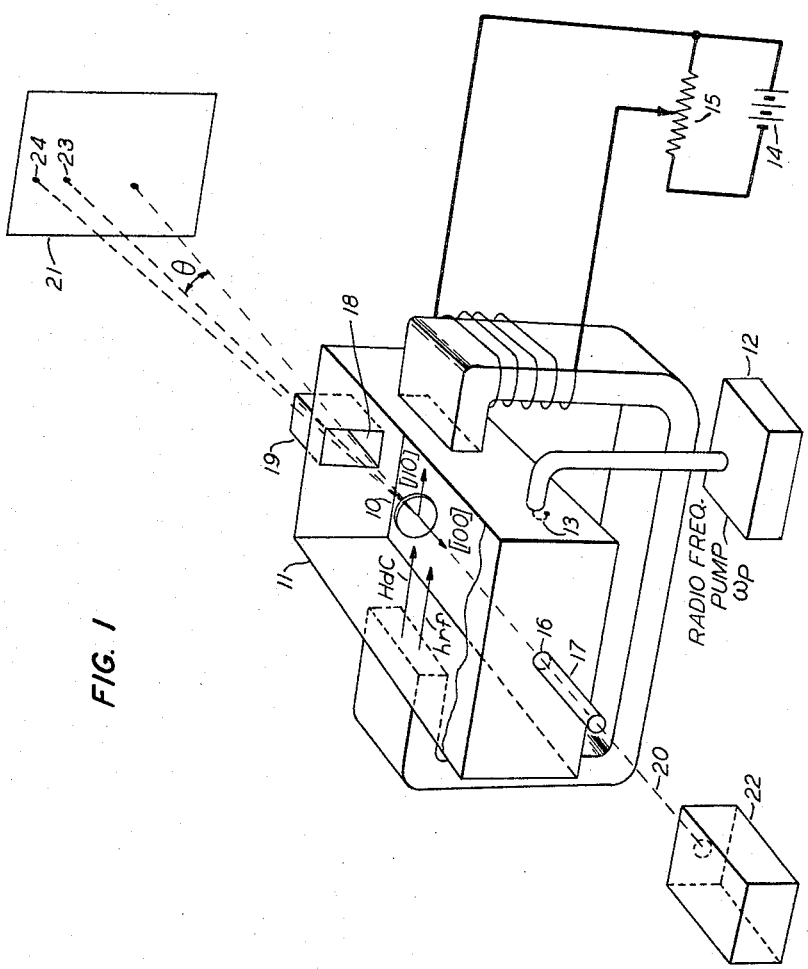
FIG. 1 is a perspective view, partly in schematic, of an optical system including a deflector in accordance with the invention.

Referring more particularly to FIG. 1, a light deflection system is shown in which the active medium comprises a disc 10 of single crystal yttrium iron garnet, this material being one suitable member of the class of ferrimagnetic iron garnets. For reasons which will become clear hereinafter, it is preferred that disc 10 be formed relative to the natural crystal axes of the material with the plane of the disc perpendicular to the [100] axis and including a [110] axis in this plane.

As disclosed and claimed in U.S. Patent 2,974,568 granted Mar. 14, 1961 to the applicant Dillon hereof, yttrium iron garnet and others of the same class have been found to be substantially transparent to infrared light and light of shorter wavelengths. In addition, when magnetically polarized in a given direction, large Faraday effect rotations of light propagating parallel to the direction of magnetic polarization have been observed. This means that the material is circularly dichroic and in particular introduces different phase velocities to light having positive and negative circular polarized components relative to the magnetic polarization.

This fact is utilized in accordance with the present invention by generating within disc 10 a periodic magnetic polarization parallel to the direction of light propagation by applying to disc 10 a radio frequency magnetic field $h_{rf}$ and a direct current magnetic field $H_{dc}$ suitably directed to generate magnetic spin waves. These spin waves have associated with them a component of magnetization extending through the thickness of disc 10 which varies sinusoidally across its face thus producing a similar variation in the phase velocity presented to light directed upon the face by a suitable optical system. This acts like a diffraction grating and light passing through disc 10 is diffracted at an angle dependent upon the wavelength of the spin waves in the disc.

In accordance with the specific embodiment illustrated, disc 10 is located within a suitably shaped conductively bounded cavity 11 at a point therein having an RF magnetic field component along the [110] axis. According to one form of construction for which numerous equivalents will occur to those skilled in the art, disc 10 is located in the center of the standing wave pattern in a cavity comprising a one-wave length shorted section of rectangular waveguide so that the cavity is resonant at the frequency $\omega_p$ of the RF signal, hereinafter to be referred to as the pump signal, suitably supplied through coupling loop 13 from a source 12. The field $H_{dc}$ is also directed along the [110] axis of disc 10 and may be applied by a suitably shaped solenoid fed from a current source 14 through rheostat 15.

A suitable optical system is schematically illustrated in FIG. 1, comprising a source 22 of collimated light beam 20, such as an optcial maser. For the purposes of the present invention it is immaterial whether the light in beam 20 is linearly polarized, circularly polarized or randomly polarized. Beam 20 is directed through an aperture 16 in the wall of cavity 11 which is surrounded by a chimney 17. The dimensions of aperture 16 and chimney 17 are such as to prevent leakage of microwave power from cavity 11. Beam 20 passes into disc 10 perpendicular to its face, emerges through an elongated slit 18 also provided with shield 19 to prevent loss of microwave energy, and impinges on a point on the object plane 21. Object plane 21 is representative of an array of light sensitive storage devices, an array of photo-sensitive switching elements, a coding plate or any one of a number of kinds of devices depending upon the particular use or application of the deflection system. Optionally, a suitable system of lenses not shown may be interposed along the path of the light beam according to the practice in the art. A disclosure, by way of example, of such a lens system may be found in the copending application of E. I. Gordon, Ser. No. 377,353, filed July 23, 1964, now Patent 3,413,476 granted Nov. 26, 1968.

The conditions set forth above have been referred to in the art as "parallel pumping" in which spin waves are excited at one-half the pump frequency $\omega_p$ by the application of parallel $h_{rf}$ and $H_{dc}$ fields. A full development of this phenomenon and the equations which underline it may be found, for instance, in an article by F. R. Morgenthaler, 31, Journal of Applied Physics, 95S (1960).

As set forth in this and other publications, spin waves having an angular frequency $\omega_p/2$ are set up under the conditions defined. In particular, the frequency is defined by the well-known relationship $$\left(\frac{\omega_p}{2}\right)^2 = \gamma^2(H_i + Dk^2)(H_i + Dk^2 + 4\pi M_s) \quad (1)$$

where $\gamma$ is the gyromagnetic ratio,
$H_i$ is the internal field after accounting for demagnetizing factors,
$M_s$ is the saturation magnetization,
$D$ is the exchange constant,
$k$ is the wave number and is defined $$k = \frac{2\pi}{\lambda_s} \quad (2)$$

where $\lambda_s$ is the wavelength of the spin waves. Thus it is seen that for a given pumping frequency, each value of field strength $H_i$ has associated with it a particular value of $k$.

Figure 2:
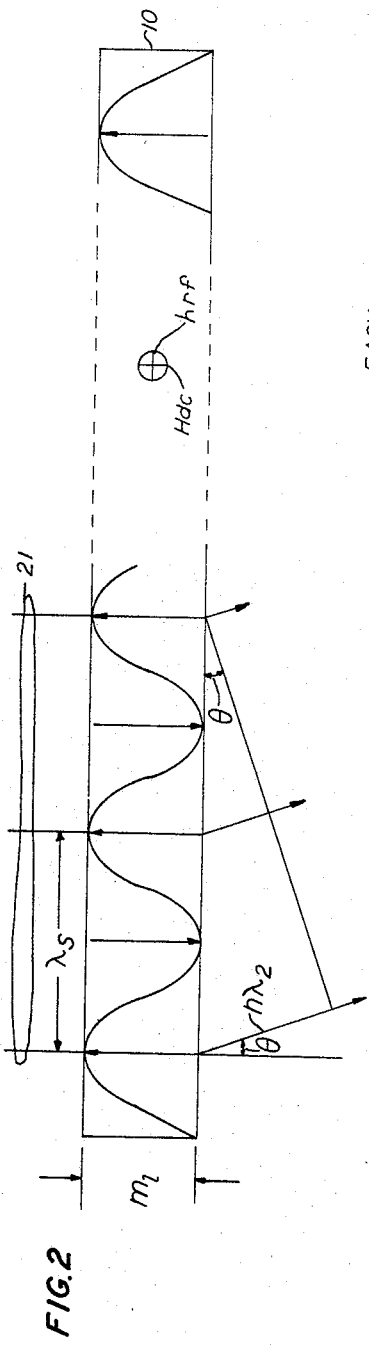
FIG. 2 is a cross sectional view taken through the active deflection element of FIG. 1.

The generated magnetic spin waves tend to propagate either as traveling or standing waves in directions perpendicular to both the [110] axis and the [100] axis because of the crystal anisotropy. This therefore causes them to extend transversely across the face of disc 10. A description of the role of the direction of the crystal axes relative to the applied DC and RF magnetic fields in determining the direction of the generated spin waves may be found in an article "Spin-Wave Anisotropy Effects in Parallel Pumping in YIG" by J. C. Sethares et al., 35, Journal of Applied Physics, 898 (1964). These magnetic spin waves in turn generate a component of magnetization $m_1$ extending through the thickness of the disc and varying periodically across its face along a line perpendicular to the applied RF and DC magnetic fields. This is illustrated in FIG. 2 in which a fractional portion of disc 10 is shown in a cross section taken perpendicularly to the applied RF and DC magnetic fields with the periodic variation of $m_1$ superimposed thereon.

The spacing between points of equal phase of $m_1$ corresponds to the wavelength of the spin wave $\lambda_s$ which as shown above in Equation 2 depends upon the wave number $k$ which in turn is a function of the magnetic field strength $H_i$. Thus, $\lambda_s$ is critically dependent upon $H_{dc}$.

Resolving the incident light beam 21 into its clockwise and counterclockwise components, and considering each of these separately, it will be seen that a circularly polarized component of given sense sees spaced regions in which it has a positive relationship with respect to $m_1$ and has one phase constant, and alternate regions having a negative relationship with respect to $m_1$ and having a different phase constant. Thus, the beam sees a diffraction grating of the Debye-Sears type and is diffracted into a first order diffraction lobe defined by the relationship $$\sin \theta = \frac{\lambda_L}{\lambda_s} \quad (3)$$

where $\theta$ is the diffraction angle from normal, $\lambda_L$ is the wavelength of the light, and $\lambda_s$ is the grating spacing equivalent to the spin wave wavelength. As shown vectorially in FIG. 3, the angle $\theta$ defines that direction in which the optical path difference between rays from a plurality of successive points of equal phase spaced $\lambda_s$ apart, will be an integral multiple of the optical wavelength $\lambda_L$. Since the opposite sense of circularly polarized light will see a complementary phase variation, its components will be diffracted by the same angle and will impinge upon the same point on image plane 21. Varying the magnitude of $H_{dc}$ to vary $\lambda_s$, as by varying rheostat 15, will cause the beam to be diffracted to different spots such as 23 and 24 on object plane 21 along a given vertical line, each displaced from the undeflected spot 25 by a new angle $\theta$. If $H_{dc}$ is switched between distinct values, the light spot will correspondingly jump between discrete spots on plane 21. Further analysis of the basic Debye-Sears diffraction phenomenon may be found in any standard optical textbook, for example, see chapter XII, "Principles of Optics," Born and Wolf, 1964.

The thickness of disc 10 in a given application depends upon a compromise between several factors. In particular, the optical attenuation of a given material is small when the path length through the material is small. Similarly, the optical bandwidth of the device is decreased by increasing the path length. On the other hand, the degree of magneto-optic interaction is increased by increasing the path length. Thus, the proper path length with a given material for a particular application may be determined experimentally.

Since the optical resolution depends also upon $\lambda_L/\lambda_s$ for a given beam width, the principal advantage of the present invention is readily apparent. The wavelength $\lambda_s$ of the magnetic spin wave is very small, approaching that of the wavelength of light $\lambda_L$. Therefore, large diffraction angles are produced. This is to be contrasted with prior art proposals in which the diffraction grating is to be produced by an elastic wave or when the grating is produced by a microwave signal.

The principles of the invention have been illustrated with respect to a method of spin wave generation by parallel pumping with the particular field and crystal axis orientations described because these relationships appear to be the most efficient. It should be understood however, that other arrangements known to produce the excitation of spin waves may also be employed. In this connection reference may be had to a paper "The Theory of Ferromagnetic Resonance at High Signal Powers" by H. Suhl, 1, Journal of Physics and Chemistry of Solids, 209, April 1957.

Furthermore, the principles of the invention are not limited to operation with the very short wavelength spin waves but include also the longer wavelength waves referred to in the art as magnetostatic waves and with magnetoelastic waves as well. It is therefore understood that the term "magnetic" wave as employed in the appended claims includes spin waves, magnetoelastic waves, magnetostatic waves and other waves having a substantial magnetic component.

While the general class of ferrites, including yttrium iron garnet, appear preferable because of their large optical effects at room temperatures, other magnetic materials which have ordered spin systems and which are relatively transparent in some portion of the optical spectrum may also be used. In particular, ionic crystals, such as the trivalent chromium compounds of chlorine, bromine and iodine, when operated at temperatures below their Curie points, are ferromagnetic, are known to exhibit substantial Faraday rotation, and are transparent to frequencies in the optical spectrum. In this connection further reference may be had to the copending application of the applicant Dillon hereof, Ser. No. 206,102, filed June 28, 1962, now Patent No. 3,245,314, granted Apr. 12, 1966.

Figure 3B:
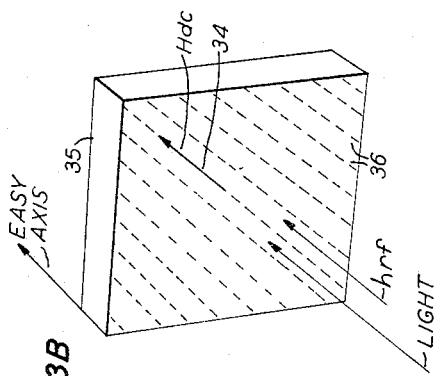
FIGS. 3A and 3B are schematic representations of relative parameter directions in accordance with alternative forms of the invention.
Figure 3A:
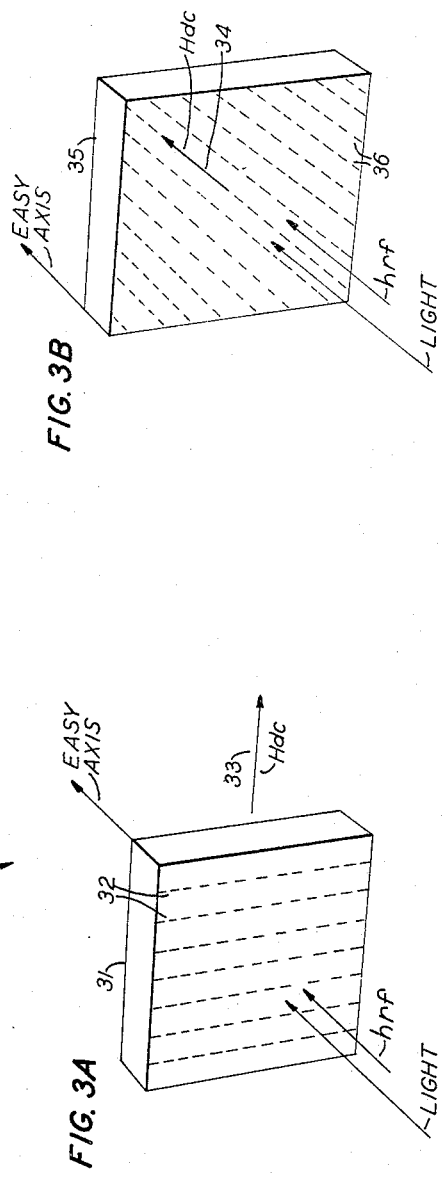

FIGS. 3A and 3B show schematically the orientation of two particular sets of parameters suitable for chromium tribromide. Thus, it has been found that a thin, substantially square waferlike sample 31 formed with the easy axis of magnetization normal to the major plane of the sample, as shown in FIG. 3A, if biased by a steady field 33 in the plane of the sample and pumped by a radio frequency field normal to this plane, will exhibit a diffraction pattern 32 with lines extending perpendicular to the biasing field. On the other hand, it has been found that if the biasing field 34 is applied along a diagonal of a sample 35 as shown in FIG. 3B, the diffraction pattern 36 forms lines parallel to the biasing field. It is believed that the modes forming these patterns are magnetostatic modes and are therefore influenced by the shape of the sample. Low orders of these modes have been described by the applicant Dillon in Proceedings of the International Conference on Magnetism, Nottingham, Sept. 7–11, 1964, pp. 369–373.

While only one deflector has been shown producing deflection in a single plane, it is apparent that a pair of orthogonally related deflectors can produce diffraction in two dimensions to cover an area as disclosed in the above-mentioned patent of E. I. Gordon. Furthermore, a large plurality of deflectors can be arranged in an array suitable for digital deflection under the control of a plurality of input signals as disclosed in the copending application of T. J. Nelson, Ser. No. 239,948, filed Nov. 26, 1962, assigned to the common assignee of the present application. Finally, a single deflector associated with an appropriate mask can produce an amplitude modulation of the beam.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A light beam deflecting arrangement comprising a body of ferromagnetic material that is relatively transparent at the frequency of said light beam, means for directing said light beam through said body in a given direction, and means including a radio frequency magnetic field and a direct current magnetic field for generating within said body magnetic waves having a component of magnetization extending in said given direction that varies periodically across a plane normal to said given direction with a period that is a function of the strength of said direct current magnetic field, said periodic variation producing an effective optical diffraction grating.

2. A light beam deflecting arrangement comprising a member of magnetic material that has an ordered spin system and that is relatively transparent at the frequency of said light beam, means including a direct current magnetic field applied parallel to a given plane of said member and a radio frequency magnetic field for generating within said body spin waves having a component of magnetization perpendicular to said plane that varies periodically across said plane to produce an effective optical diffraction grating, and means for directing said light beam through said body in a direction parallel to said component.

3. The arrangement of claim 2 wherein said member is a disc of yttrium iron garnet and wherein both said magnetic fields are applied parallel to the plane of said member.

4. The arrangement of claim 2 wherein said member is a waferlike sample of chromium tribromide and where said radio frequency magnetic field is applied perpendicular to the plane of said member.

5. The combination according to claim 2 including a plurality of means each displaced by different angles from said direction for utilizing said beam after passage through said member, and means for varying said direct current field through unique values each of which produces spin waves of different wavelengths corresponding to one of said different angles.

References Cited

UNITED STATES PATENTS 2,974,568  3/1961  Dillon.

OTHER REFERENCES

Morgenthaler: "Survey of Ferromagnetic Resonance in Small Ferrimagnetic Ellipsoids," Journal of Applied Physics, vol. 31, pp. 95S–97S, May 1960.

Sethares et al.: "Spin-Wave Anisotropy Effects in Parallel Pumping in YIG," Journal of Applied Physics, vol. 35, pp. 898–99, March 1964.

JEWELL H. PEDERSEN, Primary Examiner

E. BAUER, Assistant Examiner

U.S. Cl. X.R.

350—161, 162